USO10953490B2

(12) United States Patent
Murakami

(10) Patent No.: US 10,953,490 B2
(45) Date of Patent: Mar. 23, 2021

(54) LASER MACHINING APPARATUS

(71) Applicant: FANUC CORPORATION, Yamanashi (JP)

(72) Inventor: Yoshinori Murakami, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 273 days.

(21) Appl. No.: 16/191,745

(22) Filed: Nov. 15, 2018

(65) Prior Publication Data

US 2019/0151988 A1 May 23, 2019

(30) Foreign Application Priority Data

Nov. 20, 2017 (JP) .............. JP2017-222826

(51) Int. Cl.
B23K 26/06 (2014.01)
B23K 26/082 (2014.01)
B23K 26/08 (2014.01)
B23K 26/70 (2014.01)

(52) U.S. Cl.
CPC ...... B23K 26/0821 (2015.10); B23K 26/0643 (2013.01); B23K 26/0648 (2013.01); B23K 26/0884 (2013.01); B23K 26/707 (2015.10)

(58) Field of Classification Search
CPC ...... B23K 26/02; B23K 26/03; B23K 26/035; B23K 26/04; B23K 26/042; B23K 26/043; B23K 26/046; B23K 26/048; B23K 26/0643; B23K 26/0648; B23K 26/0821;

(Continued)

(56) References Cited

U.S. PATENT DOCUMENTS

| 4,358,659 A * | 11/1982 | Spohnheimer | H01L 21/268 219/121.62 |
| 5,624,587 A * | 4/1997 | Otsuki | B23K 26/04 219/121.83 |
| 2013/0001208 A1* | 1/2013 | Jurca | B23K 26/046 219/121.83 |

FOREIGN PATENT DOCUMENTS

| JP | 05-014035 | 1/1993 |
| JP | 05-237682 | 9/1993 |
| JP | 05-245675 | 9/1993 |

(Continued)

OTHER PUBLICATIONS

Notification of Reasons for Refusal dated Oct. 15, 2019 in Japanese Patent Application No. 2017-222826.

Primary Examiner — Sang Y Paik
(74) Attorney, Agent, or Firm — Wenderoth, Lind & Ponack, L.L.P.

(57) ABSTRACT

A laser machining apparatus includes a machining correlation data management unit configured to manage machining correlation data which associates a position in an optical axis direction of a focus lens with a focus position for machining when machining light is condensed by the focus lens, a focus confirmation correlation data management unit configured to manage or create focus confirmation correlation data which associates the position in the optical axis direction of the focus lens with a focus position for focus confirmation when the guide light is condensed by the focus lens, and a lens driving mechanism control unit configured to move, in a first mode, the focus lens in the optical axis direction based on the machining correlation data, and to move, in a second mode, the focus lens in the optical axis direction based on the focus confirmation correlation data.

3 Claims, 10 Drawing Sheets

(58) Field of Classification Search
CPC . B23K 26/0884; B23K 26/705; B23K 26/707
See application file for complete search history.

(56) References Cited

FOREIGN PATENT DOCUMENTS

| | | |
|---|---|---|
| JP | 2003-043404 | 2/2003 |
| JP | 2005-271563 | 10/2005 |
| JP | 2007-237200 | 9/2007 |

\* cited by examiner

FIG. 4A

| LENS POSITION | FOCUS POSITION OF MACHINING LIGHT |
|---|---|
| +2mm | +50mm |
| +1mm | +25mm |
| 0mm | 0mm |
| −1mm | −25mm |

FIG. 4B

| LENS POSITION | FOCUS POSITION OF GUIDE LIGHT |
|---|---|
| +2mm | +70mm |
| +1mm | +50mm |
| 0mm | +25mm |
| −1mm | 0mm |

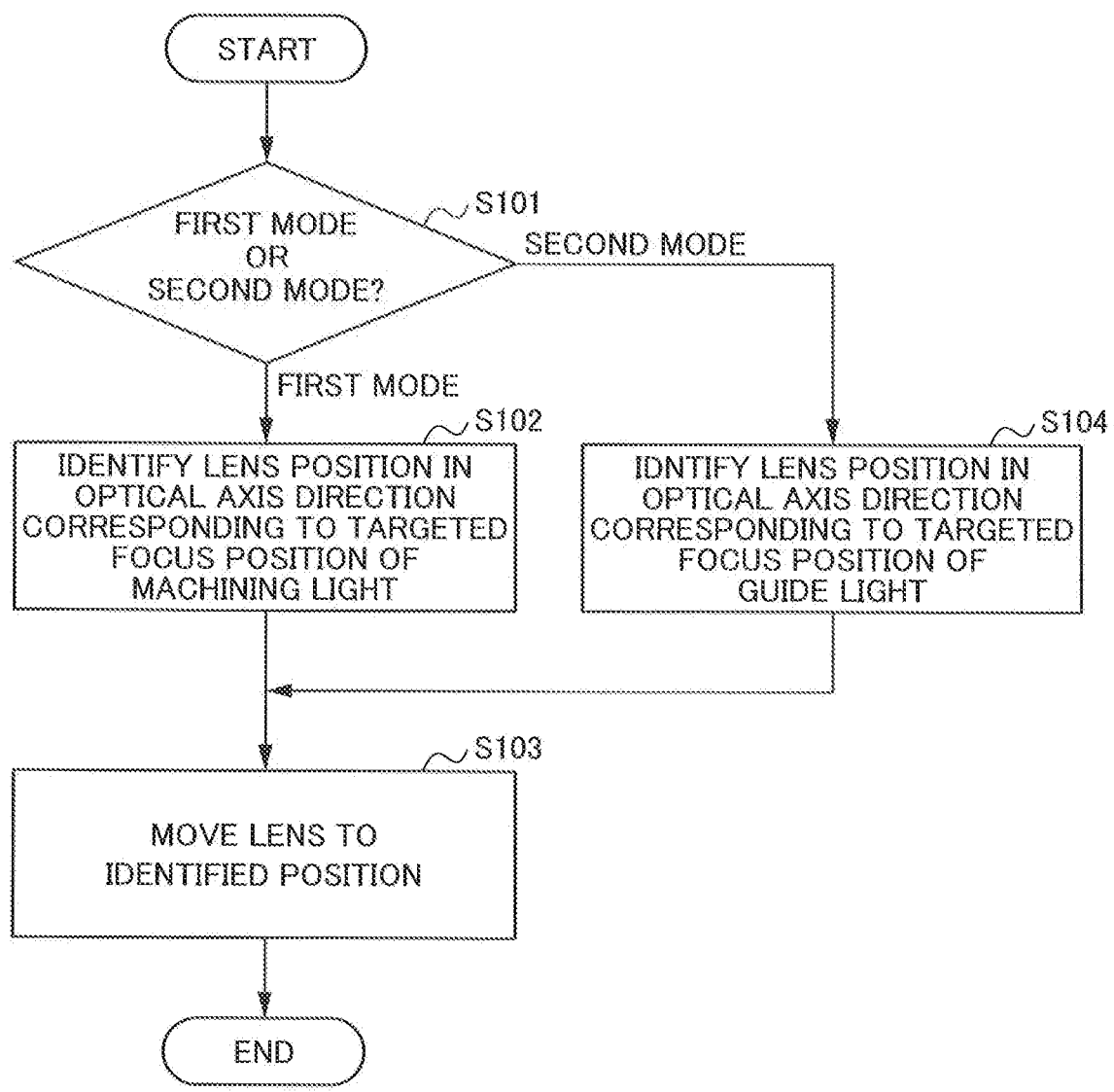

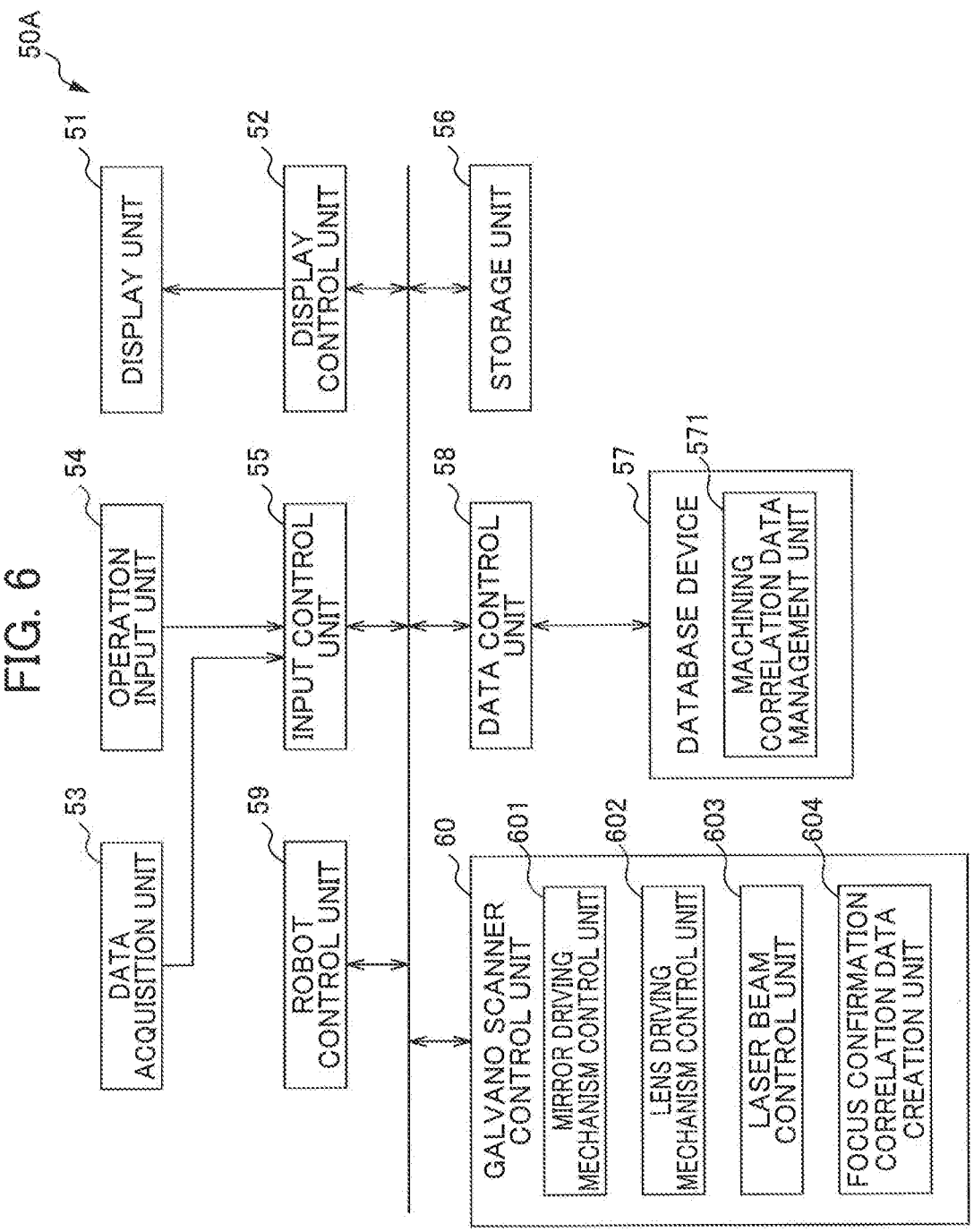

FIG. 7

| LENS POSITION | FOCUS POSITION OF MACHINING LIGHT | COMPENSATION COEFFICIENT a | FOCUS POSITION OF GUIDE LIGHT |
|---|---|---|---|
| +2mm | +50mm | a1 | +70mm |
| +1mm | +25mm | a2 | +50mm |
| 0mm | 0mm | a3 | +25mm |
| −1mm | −25mm | a4 | 0mm |

LASER MACHINING APPARATUS

This application is based on and claims the benefit of priority from Japanese Patent Application No. 2017-222826, filed on 20 Nov. 2017, the content of which is incorporated herein by reference.

BACKGROUND OF THE INVENTION

Field of the Invention

The present invention relates to a laser machining apparatus including a galvano scanner.

Related Art

A conventional laser machining apparatus is known, including a laser head having a galvano scanner provided at the tip of an arm of a multi-axis robot. A galvano scanner is an apparatus which includes two rotatable mirrors around two rotary axes (X axis, Y axis) orthogonal to each other, and these mirrors are driven to rotate by servomotors, thereby scanning a laser beam output by a laser beam source (refer to, for example, Patent Document 1), Patent Document to Japanese Unexamined Patent Application, Publication No. 2003-43404

SUMMARY OF THE INVENTION

In remote welding performed by a laser machining apparatus including a multi-axis robot, a workpiece is irradiated with a laser beam for focus confirmation (hereinafter, also referred to as "guide light") coaxially with a laser beam for machining (hereinafter, also referred to as "machining light"), in order to teach the multi-axis robot the focus position of the laser beam. It is noted that the guide light is a laser beam in a visible light region which is visible to an operator, unlike the machining light which is invisible to an operator. By irradiating a machining surface of the workpiece (object) with the guide light coaxially with the machining light, the operator can, while grasping the focus position of the invisible machining light, teach the multi-axis robot the position where the machining light is focused (a coordinate position of an optical axis).

Since the machining light and the guide light have different chromatic aberrations due to having different wavelengths, respectively, a large deviation occurs between the focus position of the guide light and the focus position of the machining light especially in a galvano scanner having a long-focus optical system. Accordingly, even if the invisible machining light is focused at the focus position on the machining surface of the workpiece, the outline of the focus becomes blurred with regards to the visible guide light, and thus, an operator may recognize that the guide light is not focused. As described above, a conventional laser machining apparatus has a problem in that it becomes difficult for an operator to determine whether the guide light is focused at the focus position or not.

The object of the present invention is to provide a laser machining apparatus by which an operator can easily determine that a laser beam for focus confirmation is focused at a focus position on a machining surface of an object.

(1) The present invention relates to a laser machining apparatus (for example, a laser machining apparatus 1 to be described below), the laser machining apparatus comprising a first light source (for example, a laser beam source 3 to be described below) configured to output a laser beam for machining, a second light source (for example, a laser beam source 3 to be described below) configured to output a laser beam for focus confirmation having a wavelength which is different from a wavelength of the laser beam for machining, a focus lens (for example, a lens 45 to be described below) configured to condense the laser beam output by the first light source or the second light source toward an object respectively and coaxially, a mirror mechanism (for example, a first mirror 41, a second mirror 42, and rotary motors 43, 44 to be described below) configured to reflect the laser beam passed through the focus lens toward the object, and a lens driving mechanism (for example, a lens driving mechanism 46 to be described below) configured to move the focus lens in an optical axis direction of the laser beam, so as to irradiate the object with the laser beam output by the first light source or the second light source via the focus lens and the mirror mechanism, the laser machining apparatus further comprising a machining correlation data management unit (for example, a machining correlation data management unit 571 to be described below) configured to manage machining correlation data which associates a position in the optical axis direction of the focus lens with a focus position for machining when the laser beam for machining is condensed by the focus lens, a focus confirmation correlation data management unit (for example, a focus confirmation correlation data management unit 572 to be described below) configured to manage or create focus confirmation correlation data which associates the position in the optical axis direction of the focus lens with a focus position for focus confirmation when the laser beam for focus confirmation is condensed by the focus lens, and a lens driving mechanism control unit (for example, a lens driving mechanism control unit 602 to be described below) configured to move, in a first mode, the focus lens in the optical axis direction based on the position of the focus lens in the optical axis direction corresponding to the targeted focus position for machining in the machining correlation data, and to move, in a second mode, the focus lens in the optical axis direction based on the position of the focus lens in the optical axis direction corresponding to the targeted focus position for focus confirmation in the focus confirmation correlation data.

(2) The present invention relates to a laser machining apparatus (for example, a laser machining apparatus 1 to be described below), the laser machining apparatus comprising a first light source (for example, a laser beam source 3 to be described below) configured to output a laser beam for machining, a second light source (for example, a laser beam source 3 to be described below) configured to output a laser beam for focus confirmation having a wavelength which is different from a wavelength, of the laser beam for machining, a focus lens (for example, a lens 45 to be described below) configured to condense the laser beam output by the first light source or the second light source toward an object respectively and coaxially, a mirror mechanism (for example, a first mirror 41, a second mirror 42, and rotary motors 43, 44 to be described below) configured to reflect the laser beam Passed through the focus lens toward the object, and a lens driving mechanism (for example, a lens driving mechanism 46 to be described below) configured to move the focus lens in an optical axis direction of the laser beam, so as to irradiate the object with the laser beam output by the first light source or the second light source via the focus lens and the mirror mechanism, the laser machining apparatus further comprising a machining correlation data management unit (for example, a machining correlation data management, unit 571 to be described below) configured to manage machining correlation data which associates a position of the focus lens in the optical axis direction with a focus position for machining when the laser beam for machining is condensed by the focus lens, a focus confirmation correlation data management unit (for example, a focus confirmation correlation data creation unit 604 to be described below) configured to calculate a focus position for focus confirmation when the laser beam for focus confirmation is condensed by the focus lens, based or the focus position for machining in the machining correlation data and a preset compensation coefficient, and to create focus confirmation correlation data which associates the position in the optical axis direction of the focus lens with the focus position for focus confirmation, and a lens driving mechanism control unit (for example, a lens driving mechanism control unit 602 to be described below) configured to move, in a first mode, the focus lens in the optical axis direction based on the position of the focus lens in the optical axis direction corresponding to the targeted focus position for machining in the machining correlation data, and to move, in a second mode, the focus lens in the optical axis direction based on the position of the focus lens in the optical axis direction corresponding to the targeted focus position for focus confirmation in the focus confirmation correlation data created by the focus confirmation correlation data management unit.

(3) The present invention relates to a laser machining apparatus (for example, a laser machining apparatus 1 to be described below), the laser machining apparatus comprising a first light source (for example, a laser beam source 3 to be described below) configured to output a laser beam for machining, a second light source (for example, a laser beam source 3 to be described below) configured to output a laser beam for focus confirmation having a wavelength which is different from a wavelength of the laser beam for machining, a focus lens (for example, a lens 45 to be described below) configured to condense the laser beam output by the first light source or the second light source toward an object respectively and coaxially, a mirror mechanism (for example, a first mirror 41, a second mirror 42, and rotary motors 43, 44 to be described below) configured to reflect the laser beam passed through the focus lens toward the object, and a lens driving mechanism (for example, a lens driving mechanism 46 to be described below) configured to move the focus lens in an optical axis direction of the laser beam, so as to irradiate the object with the laser beam output by the first light source or the second light source via the focus lens and the mirror mechanism, the laser machining apparatus further comprising a position data calculation unit (for example, a position data calculation unit 605 to be described below) configured to calculate, in a first mode, a position of the focus lens in the optical axis direction through a first conversion formula using, as parameters, a targeted value of a focus position when the laser beam for machining is condensed by the focus lens and a first coefficient set with respect to the laser beam for machining, and to calculate, in a second mode, the position in the optical axis direction of the focus lens through a second conversion formula using, as parameters, the targeted value of the focus position and a second coefficient set with respect to the laser beam for focus confirmation, and a lens driving mechanism control unit (for example, a lens driving mechanism control unit 602 to be described below) configured to move, in the first mode, the focus lens in the optical axis direction based on the position of the focus lens in the optical axis direction calculated with the first conversion formula by the position data calculation unit, and to move, in the second mode, the focus lens in the optical axis direction on a basis of the position of the focus lens in the optical axis direction calculated with the second conversion formula by the position data calculation unit.

The present invention enables to provide a laser machining apparatus by which an operator can easily determine that a laser beam for focus confirmation is focused at a focus position on a machining surface of an object.

BRIEF DESCRIPTION OF THE DRAWINGS

FIG. 4A is a data table indicating one example of machining correlation data.

FIG. 4B is a data table indicating one example of focus confirmation correlation data.

FIG. 5 is a flowchart indicating the procedure in the lens position driving program to be executed by the laser machining apparatus 1 of the first embodiment, FIG. 6 is a block diagram illustrating the configuration of a control unit 50A in a second embodiment.

FIG. 7 is a data table indicating one example of focus confirmation correlation data in the second embodiment.

DETAILED DESCRIPTION OF THE INVENTION

Some embodiments of a laser machining apparatus according to the present invention will be described below. It is noted that the drawings attached to the present specification are all schematic diagrams, and thus, shapes, scales, aspect ratios, etc. of the respective units and parts are changed or exaggerated as compared with the actual ones in consideration of facilitating understanding, and the like.

First Embodiment

Figure 1:
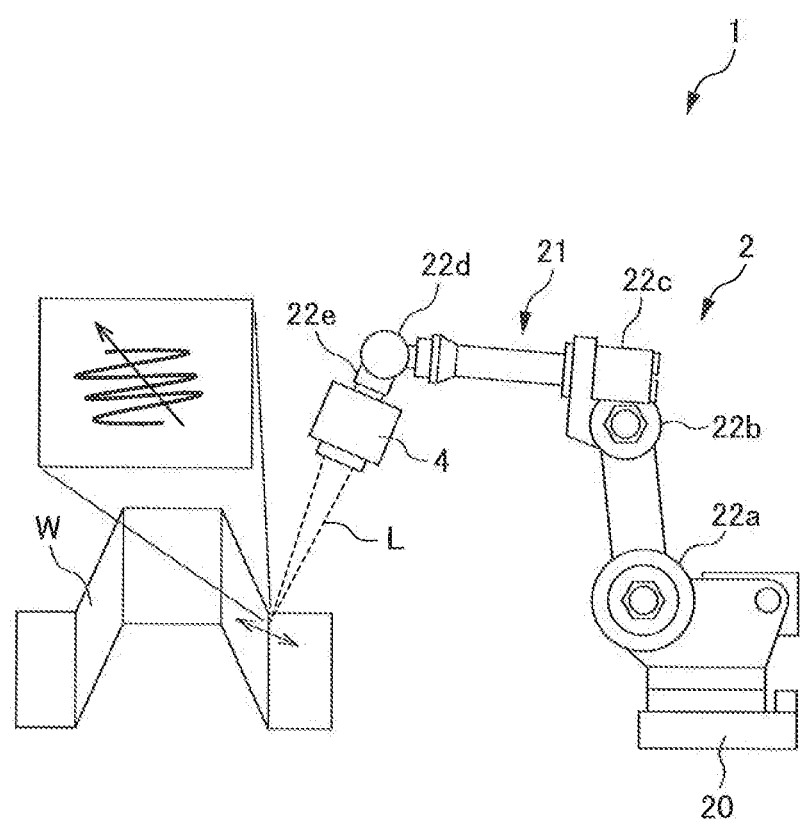
FIG. 1 is an external view of a laser machining apparatus 1 according to a first embodiment.
Figure 2:
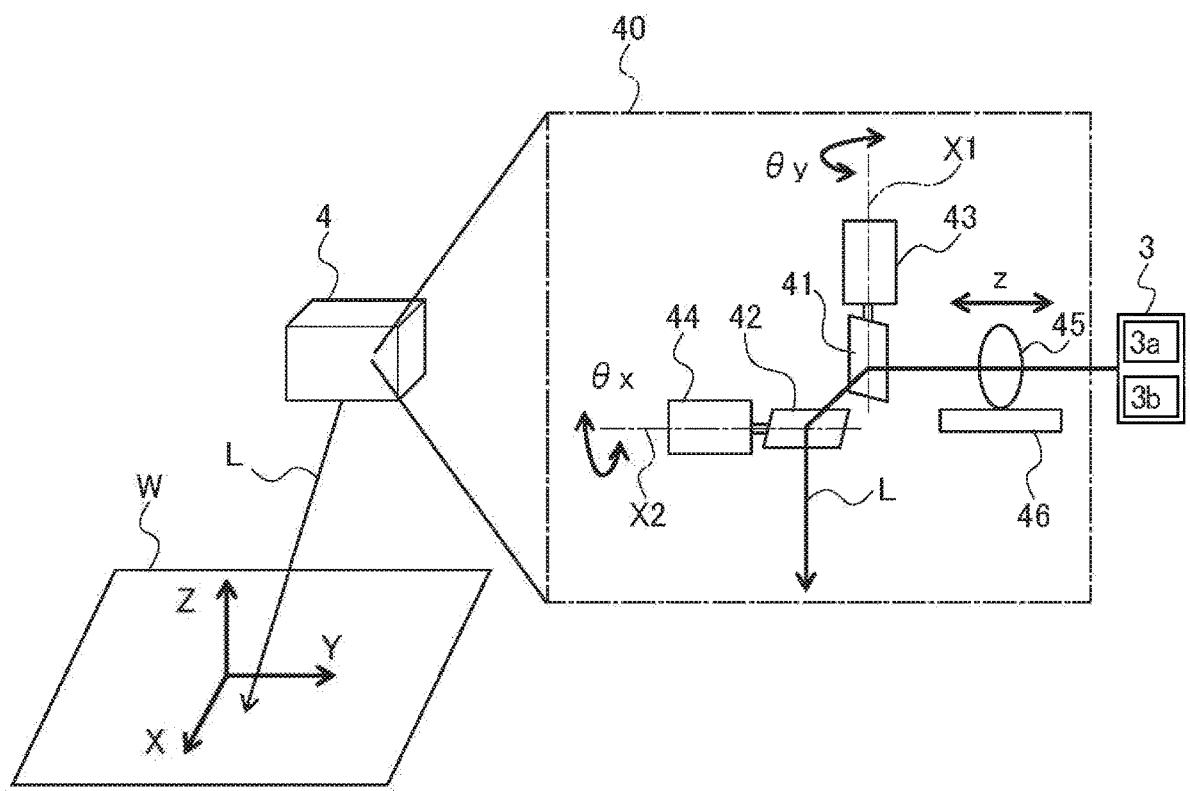
FIG. 2 is a diagram for explaining an optical system of the laser machining apparatus 1 according to the first embodiment.

FIG. 1 is an external view of a laser machining apparatus 1 according to the first embodiment. FIG. 2 is a diagram for explaining an optical system of the laser machining apparatus 1 according to the first embodiment. As shown in FIG. 1 and FIG. 2, the laser machining apparatus 1 according to the first embodiment includes a multi-axis robot 2, a laser beam source 3, and a laser head 4 provided at the Lip of an arm 21 of the multi-axis robot 2.

The laser machining apparatus 1 conveys the laser head 4 provided at the tip of the arm 21 by the motion of the multi-axis robot 2, and irradiates a butting machining point of a workpiece W (for example, an automobile body) to be machined with a laser beam L from the laser head 4, thereby performing various types of welding, such as weaving welding.

As shown in FIG. 1, the multi-axis robot 2 includes a base part 20, the arm 21, a plurality of shafts 22a to 22e, and robot motors (not shown) configured with servo motors for driving the respective shafts. The motion of the multi-axis robot 2 is controlled by a robot control unit 59 (refer to FIG. 3) to be described below.

In FIG. 2, the laser beam source 3 is configured with a laser oscillator including a laser medium, an optical resonator, an excitation source and the like (none of them are shown). The laser beam source 3 generates the laser beam L and outputs the generated laser beam L toward a galvano scanner 40 to be described below. As will be described below, the laser beam source 3 of the present embodiment includes a laser oscillator 3a serving as a first light source for outputting a laser beam for machining (machining light), and a laser oscillator 3b serving as a second light source for outputting a laser beam for focus confirmation (guide light). The laser beam source 3 can, by switching between the laser oscillators, coaxially output the machining light and the guide light described above, respectively, as the laser beam L (it is noted that both lights are not output at the same time). The laser beam source 3 outputs the machining light when a first mode to be described below is set as the radiation mode of the laser beam L, and outputs the guide light when a second mode is set.

The laser head 4 has the galvano scanner 40 for scanning the laser beam L with regards to a butting machining point (butt welding point) of the workpiece W. As shown in FIG. 2, the galvano scanner 40 includes a first mirror 41 and a second mirror 42 serving as a mirror mechanism for sequentially reflecting the laser beam L output by the laser beam source 3, and two rotary motors 43, 44 for rotationally driving the first mirror 41 and the second mirror 42 around rotary axes X1 and X2, respectively.

As shown in FIG. 2, the galvano scanner 40 further includes a lens 45 (focus lens) and a lens driving mechanism 46. The lens 45 is an optical member for condensing the laser beam L output by the laser beam source 3. The lens driving mechanism 46 is an apparatus capable of moving the lens 45 in an optical axis direction. The operation of the lens driving mechanism 46 is controlled by a lens driving mechanism control unit 602 to be described below. By moving the lens 45 in the optical axis direction, the focus position of the laser beam L to be condensed by the lens 45 can be adjusted.

Figure 3:
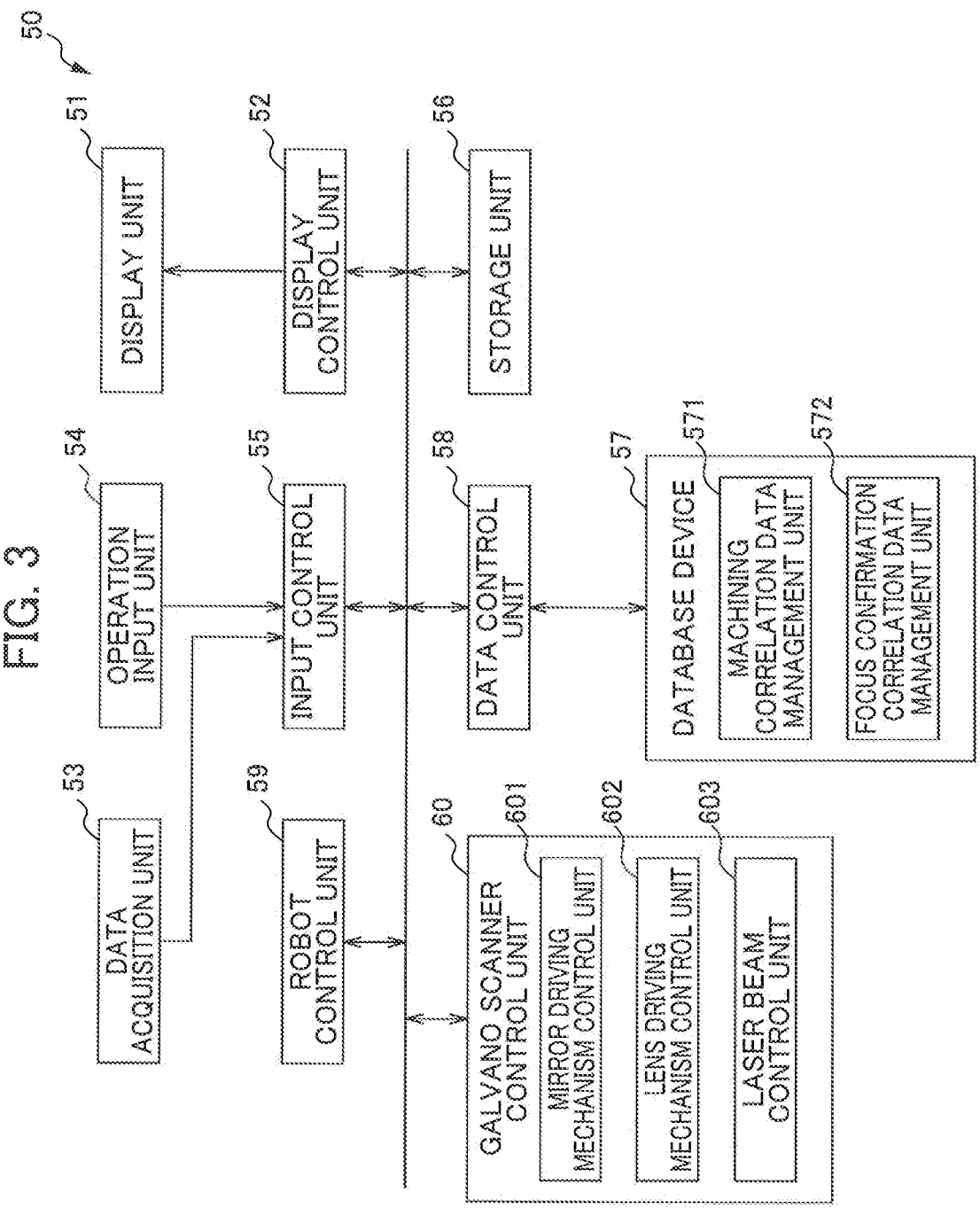
FIG. 3 is a block diagram illustrating the configuration of a control unit 50 in the first embodiment.

Next, the control system of the laser machining apparatus 1 will be described. FIG. 3 is a block diagram illustrating the configuration of a control unit 50 of the first embodiment. As shown in FIG. 3, the control unit 50 of the laser machining apparatus 1 includes a display unit 51, a display control unit 52, a data acquisition unit 53, an operation input unit 54, an input control unit 55, a storage unit 56, a database device 57, a data control unit 58, a robot control unit 59, and a galvano scanner control unit 60.

The display unit 51 is a display apparatus capable of displaying various types of data, messages, figures, and the like. For example, machining correlation data (refer to FIG. 4A) and focus confirmation correlation data (refer to FIG. 4B) to be described below can be displayed on the display unit 51. The display control unit 52 controls the displaying of various types of data on the display unit 51. The display control unit 52 makes the display unit 51 display, for example, machining correlation data (refer to FIG. 4A) or focus confirmation correlation data (refer to FIG. 4B) to be described below in a data table format upon an operator's operation instruction input through the operation input unit 54.

The data acquisition unit 53 is capable of acquiring various types of programs, data and the like to be executed by the robot control unit 59 and the galvano scanner control unit 60 to be described below. The data acquisition unit 53 is configured with, for example, one or more of: a PC (personal computer), a network communication terminal device, a reading device of a storage medium (for example, CD-ROM), and the like.

The operation input unit 54 is a unit through which an operator can input various types of character information, numerical data, operation instructions, motion instructions, and the like. The operation input unit 54 is configured with, for example, a keyboard, a mouse, and a touch panel (not shown). The input control Unit. 55 receives various types of data acquired by the data acquisition unit 53, data and instructions input through the operation input unit 54, and the lie, to store such data and instructions in the storage unit 56 or in the database device 57 via the data control unit 58.

The storage unit 56 is an internal storage device in which various types of programs, data, and the like to be executed by the robot control unit 59 and the galvano scanner control unit 60 are stored temporarily. The storage unit 56 is configured with, for example, a semiconductor memory, a hard disk device, or the like.

The database device 57 is an external storage device for storing below-described machining correlation data, focus confirmation correlation data, and the like. The database device 57 includes a machining correlation data management unit 571 and a focus confirmation correlation data management unit 572.

The machining correlation data management unit 571 of the present embodiment is configured as a storage area for the machining correlation data in the database device 57. The machining correlation data is a data associating the position in the optical axis direction of the lens 45 with the focus position for machining of the machining light when condensed by the lens 45 (hereinafter, also referred to as "the focus position of the machining light"). The machining correlation data, which is managed by the machining correlation data management unit 571, can be rewritten upon an operator's operation.

The focus confirmation correlation data management unit 572 of the present embodiment is configured as a storage area for the focus confirmation correlation data in the database device 57. The focus confirmation correlation data is a data associating the position in the optical axis direction of the lens 45 with the focus position for focus confirmation when the guide light is condensed by the lens 45 (hereinafter, also referred to as "the focus position of the guide light"). The focus confirmation correlation data, which is managed by the focus confirmation correlation data management unit 572, can be rewritten upon an operator's operation. Specific examples of the machining correlation data and the focus confirmation correlation data will be described later.

The data control unit 58 allows data to be stored in the database device 57, and allows the data which was read out from the database device 57 to be temporarily stored in the storage unit 56 or to be sent to the display control unit 52.

The robot control unit 59, which serves as a controller of the multi-axis robot 2 (refer to FIG. 1), is configured with a microprocessor including a CPU (central processing unit), a memory, and the like. The robot control unit 59 reads out an operating system, an application program, and the like from the storage unit 56 to execute them. The robot control unit 59 can, by controlling robot motors (not shown), convey the laser head 4 disposed at the tip of the arm 21 (refer to FIG. 1) of the multi-axis robot 2 to a desired position.

The galvano scanner control unit 60 is a controller configured with a microprocessor including a CPU, a memory, and the like. The galvano scanner control unit 60, by reading out an application program (for example, a lens position driving program to be described below) for controlling the galvano scanner 40 (the rotary motors 43, 44, the lens driving mechanism 46, etc.) from the storage unit 56 and executing the application program, realizes various functions described below in cooperation with respective pieces of hardware. The galvano scanner control unit 60 includes a mirror driving mechanism control unit 601, a lens driving mechanism control unit 602, and a laser beam control unit 603.

The mirror driving mechanism control unit 601 controls the rotary motors 43, 44 (refer to FIG. 2), thereby adjusting the incident angles of the laser beam L entering the first mirror 41 and the second mirror 42. As a result, in the galvano scanner 40, the radiation position of the laser beam L is adjusted. The lens driving mechanism control unit 602 controls the lens driving mechanism 46, thereby moving the lens 45 to a desired position in the optical axis direction. As a result, in the galvano scanner 40, the focus position of the laser beam L is adjusted.

In the case where the first mode to be described below is set, the lens driving mechanism control unit 602 of the present embodiment identifies the position of the lens 45 in the optical axis direction (stored in the machining correlation data managed by the machining correlation data management unit 571), corresponding to the targeted focus position of the machining light and controls the lens driving mechanism 46, thereby moving the lens 45 in the optical axis direction. In the case where the second mode to be described below is set, the lens driving mechanism control unit 602 identifies the position (stored in the focus confirmation correlation data managed by the focus confirmation correlation data management unit 572) of the lens 45 in the optical axis direction, corresponding to the targeted focus position of the guide light and controls the lens driving mechanism 46, thereby moving the lens 45 in the optical axis direction.

When the laser oscillators of the laser beam source 3 (refer to FIG. 2) are switched therebetween, the laser beam control unit 603 outputs, as the laser beam L, either the laser beam for focus confirmation (guide light) or the laser beam for machining (machining light). The switching of the laser oscillators are linked with the radiation mode of the laser beam L. In the laser machining apparatus 1 of the present embodiment, the laser beam radiation mode is set to either the first mode or the second mode. When the first mode is set as the laser beam radiation mode, switching to the laser oscillator for outputting the machining light occurs in the laser beam source 3. When the second mode is set as the laser beam radiation mode, switching to the laser oscillator for outputting the guide light occurs in the laser beam source 3.

The first mode is a mode for outputting the machining light to weld the workpiece W serving as an object. The machining light is a laser beam in a wavelength region which is invisible to an operator. The second mode is a mode for outputting the guide light for focus confirmation to confirm the focus position of the laser beam L on the machining surface of the workpiece W. The guide light is a laser beam in a visible light region which is visible to an operator.

Next, the machining correlation data managed by the machining correlation data management unit 571 of the database device 57 and the focus confirmation correlation data managed by the focus confirmation correlation data management unit 572 will be described. FIG. 4A is a data table indicating one example of the machining correlation data. FIG. 4B is a data table indicating one example of the focus confirmation correlation data.

In FIG. 4A, the "Lens position" indicate positions in the optical axis direction of the lens 45. The "Focus position of machining light" indicate focus positions at the time when the machining light is condensed by the lens 45 (refer to FIG. 2) at the respective lens positions described above. In the present embodiment, a lens position at the time when the focus position of the machining light is on the machining surface of the workpiece W, that is, when the machining light is focused on the machining surface of the workpiece W, is set as "0 mm." In the case where the lens position is 0 mm, the focus position of the machining light is expressed as "0 mm." That is, when the machining light is focused on the machining surface of the workpiece W, the focus position is expressed as 0 mm which is a reference position, instead of being expressed with focal length (for example, 500 mm) between the center of the lens 45 and the machining surface of the workpiece W.

In FIG. 4A, in the case where the lens position is −1 mm, the focus position of the machining light is "−25 mm." This indicates that, when the lens 45 is moved by −1 mm from the reference position (0 mm) in the optical axis direction, the focus position of the machining light shifts forward by −25 mm from the machining surface of the workpiece W. A lens position with "−" (minus) indicates that the lens 45 is shifted from the reference position away from the workpiece W in the optical axis direction.

Similarly, in the case where the lens position is +1 mm, the focus position of the machining light is "+25 mm." This indicates that, when the lens 45 is moved by +1 mm from the reference position in the optical axis direction, the focus position of the machining light shifts rearward by +25 mm from the machining surface of the workpiece W. The same applies to FIG. 4B and FIG. 7. A lens position with "+" (plus) indicates that the lens 45 is shifted from the reference position closer to the workpiece W in the optical axis direction.

On the other hand, as shown in FIG. 4B, when the workpiece W is irradiated with the guide light, the focus position is different from the case of the machining light, even at the same lens position. For example, in the case of the lens position of 0 mm, the focus position of the guide light is +25 mm. Such positional deviation between the focus positions occurs because the machining light and the guide light have different chromatic aberrations due to having different wavelengths, respectively.

The numerical values of the machining correlation data shown in FIG. 4A and the focus confirmation correlation data shown in FIG. 4B are just examples, and the present invention is not limited thereto (the same applies to FIG. 7 to be described below). As for the machining correlation data, an example where the lens position and the focus position of the machining light are respectively divided into four levels is shown, but the present invention is not limited thereto, and alternatively, the machining correlation data may have three levels or less, or five levels or more. A numerical value between the respective levels, such as an intermediate value between the lens position of 0 mm and the lens position of +1 mm, can be calculated using a linear interpolation method or the like (the same applies to the focus confirmation correlation data).

Next, based on the flowchart shown in FIG. 5, the processing contents of the lens position driving program to be executed by the laser machining apparatus 1 (the control unit 50) of the first embodiment will be described. FIG. 5 is the flowchart indicating the procedure in the lens position driving program to be executed, by the laser machining apparatus 1 of the first embodiment.

In step S101 shown in FIG. 5, the lens driving mechanism control unit 602 determines whether the radiation mode set by an operator is the first mode or the second mode. In the case where, in step S101, the lens driving mechanism control unit 602 determines that the set radiation mode is the first mode, that is, in a case where an operator selects to irradiate the machining light, the processing moves to step S102. On the other hand, in the case where the lens driving mechanism control unit 602 determines that the set radiation mode is the second mode, that is, in a case where an operator selects to irradiate the guide light, the processing moves to step S104.

In step S102 (the first mode in step S101), the lens driving mechanism control unit 602 references the machining correlation data managed by the machining correlation data management unit 571, and identifies the position of the lens 45 in the optical axis direction corresponding to the targeted focus position of the machining light. In step S103, the lens driving mechanism control unit 602 moves the lens 45 to the position in the optical axis direction identified in step S102. After the lens 45 is loved, the processing in the present flowchart ends.

In step S104 (the second mode in step S101), the lens driving mechanism control unit 602 references the focus confirmation correlation data managed by the focus confirmation correlation data management unit 572, and identifies the position in the optical axis direction of the lens 45 corresponding to the targeted focus position of the guide light. The lens driving mechanism control unit 602 subsequently executes the above-described processing of step S103, thereby ending the processing in the present flowchart.

According to the laser machining apparatus 1 of the first embodiment described above, the position of the lens 45 in the optical axis direction is controlled based on the respective correlation data, so that the focus position of the machining light on the machining surface of the workpiece W coincides with the focus position of the guide light on the machining surface of the workpiece W. This prevents focus of the guide light, which is the laser beam for focus confirmation, from becoming blurred on the machining surface of the workpiece W, and thus, an operator can easily determine that the guide light is focused at the focus position on the machining surface of the workpiece W.

Second Embodiment

Next, the second embodiment of the laser machining apparatus 1 according to the present invention will be described. FIG. 6 is a block diagram illustrating the configuration of a control unit 50A in the second embodiment. FIG. 7 is a data table indicating one example of focus confirmation correlation data in the second embodiment.

The control unit 50A of the second embodiment differs from that of the first embodiment in that the database device 57 includes only the machining correlation data management unit 571 and that the galvano scanner control unit 60 includes a focus confirmation correlation data creation unit 604. In the control unit 50A of the second embodiment, other configurations are the same as those of the control unit 50 of the first embodiment. Therefore, in the second embodiment, only the control unit 50A is illustrated, and the illustration of the entire laser machining apparatus 1 will be omitted. In the explanation and the diagrams of the second embodiment, the same reference numerals as those in the first embodiment are assigned to the members and the like equivalent to those in the first embodiment, whereby redundant explanation will be omitted.

In the second embodiment, the focus confirmation correlation data creation unit 604 of the galvano scanner control unit 60 calculates the focus position at the time when the guide light is condensed by the lens 45, based on the focus position of the machining light stored in the machining correlation data (the machining correlation data management unit 571) and a preset compensation coefficient. Then, the focus confirmation correlation data creation unit 604 creates the focus confirmation correlation data which associates the position in the optical axis direction of the lens 45 with the focus position of the guide light. It is noted that the compensation coefficient is stored in advance in the database device 57, and is read out when the focus confirmation correlation data creation unit 604 creates the focus confirmation correlation data. The focus confirmation correlation data created by the focus confirmation correlation data creation unit 604 is temporarily stored in the storage unit 56.

Next, the focus confirmation correlation data created by the focus confirmation correlation data creation unit 604 will be described. In FIG. 7, the values of "Lens position" and "Focus position of machining light" are the same as those in the machining correlation data of the first embodiment (refer to FIG. 4A). The "Compensation coefficient a" shows numerical values used to convert a focus position of the machining light into a focus position of the guide light. The compensation coefficients a (a1 to a4) are preset for each lens position. Next, the example of the present embodiment in which a compensation coefficient a is added to a numerical value of a focus position of the machining light, thereby calculating a focus position of the guide light, will be explained. Alternatively, the focus position of the guide light may be calculated by multiplying, dividing, or subtracting from a focus position of the machining light according to a compensation coefficient a.

The "Focus position of guide light" indicates a converted value of a focus position of the guide light obtained by adding a compensation coefficient a to a focus position of the machining light. It is noted that the data table shown in FIG. 7 schematically indicates the configuration of the focus confirmation correlation data created by the focus confirmation correlation data creation unit 604. As for the focus confirmation correlation data, it is only required that a data of the "Focus position of guide light" is substantially created. In this case, the data related to lens positions may be stored in the storage unit 56, for example, and may be referenced as the data associated with calculated focus positions of the guide light. It noted that the created focus confirmation correlation data may be deleted from the storage unit 56 after the radiation of the laser beam L in the second mode is completed, or may be stored in the storage unit 56 until new focus confirmation correlation data is created.

In the case where the first mode is set, the lens driving mechanism control unit 602 of the present embodiment identifies the position in the optical axis direction of the lens 45 corresponding to the targeted focus position of the machining light in the machining correlation data (refer to FIG. 4A) managed by the machining correlation data management unit 571, and moves the lens 45 in the optical axis direction. For example, in the case where the targeted focus position of the machining light is 0 mm, the lens position is 0 mm.

On the other hand, in the case where the second mode is set, the lens driving mechanism control unit 602 identifies the position of the lens 45 in the optical axis direction corresponding to the targeted focus position of the guide light in the focus confirmation correlation data (refer to FIG. 7) created by the focus confirmation correlation data creation unit 604, and moves the lens 45 in the optical axis direction. For example, in the case where the targeted focus position of the guide light is 0 mm, the lens position is −1 mm.

Figure 8:
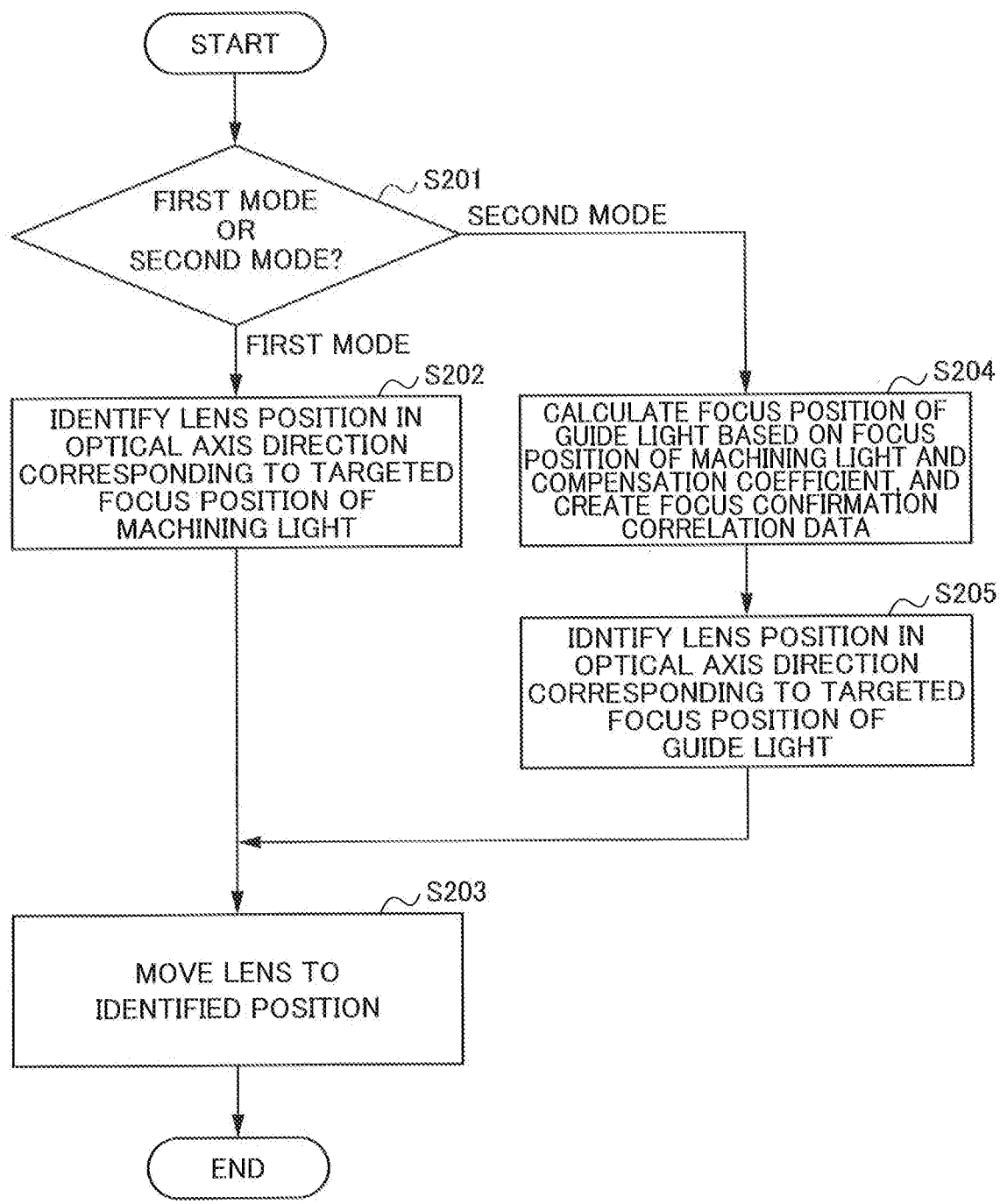
FIG. 8 is a flowchart indicating the procedure in the lens position driving program to be executed by the laser machining apparatus 1 of the second embodiment.

Next, based on the flowchart shown in FIG. 8, the processing contents of the lens position driving program to be executed by the laser machining apparatus 1 (the control unit 50A) of the second embodiment will be described. FIG. 8 is the flowchart indicating the procedure in the lens position driving program to be executed by the laser machining apparatus 1 of the second embodiment.

In step S201 shown in FIG. 8, the lens driving mechanism control unit 602 determines whether the radiation mode set by an operator is the first mode or the second mode. In the case where the lens driving mechanism control unit 602 determines in step S201 that the set radiation mode is the first mode, that is, in a case where the operator selects to irradiate the machining light, the processing moves to step S202. On the other hand, in the case where the lens driving mechanism control unit 602 determines that the set radiation mode is the second mode, that is, in a case where the operator selects to irradiate the guide light, the processing moves to step S204.

In step S202 (the first mode in step S201), the lens driving mechanism control unit 602 references the machining correlation data managed by the machining correlation data management unit 571 (the database device 57), and identifies the position of the lens 45 in the optical axis direction corresponding to the targeted focus position of the machining light. In step S203, the lens driving mechanism control unit 602 moves the lens 45 to the position in the optical axis direction identified in step S202. After the lens 45 is moved, the processing in the present flowchart ends.

On the other hand, in step S204 (the second mode in step S201), the focus confirmation correlation data creation unit 604 calculates the focus position at the time when the guide light is condensed by the lens 45, based on the focus position of the machining light stored in the machining correlation data and a preset compensation coefficient a, and creates the focus confirmation correlation data (refer to FIG. 7).

In step S205, the lens driving mechanism control unit 602 references the focus confirmation correlation data created by the focus confirmation correlation data creation unit 604, and identifies the position in the optical axis direction of the lens 45 corresponding to the targeted focus position of the guide light. The lens driving mechanism control unit 602 subsequently executes the above-described processing in step S203, thereby ending the processing in the present flowchart.

Also, in the laser machining apparatus 1 of the second embodiment described above, as in the first embodiment, since the focus of the guide light which is the laser beam for focus confirmation is prevented from becoming blurred on the machining surface of the workpiece W, an operator can easily determine that the guide light is focused at the focus position on the machining surface of the workpiece W. In particular, the laser machining apparatus 1 of the second embodiment creates the focus confirmation correlation data based on the focus position of the machining light stored in the machining correlation data and a preset compensation coefficient a, thereby enabling to reduce the storage capacity of the database device 57 as compared with the configuration in which the focus confirmation correlation data is stored or the database device 57.

Third Embodiment

Figure 9:
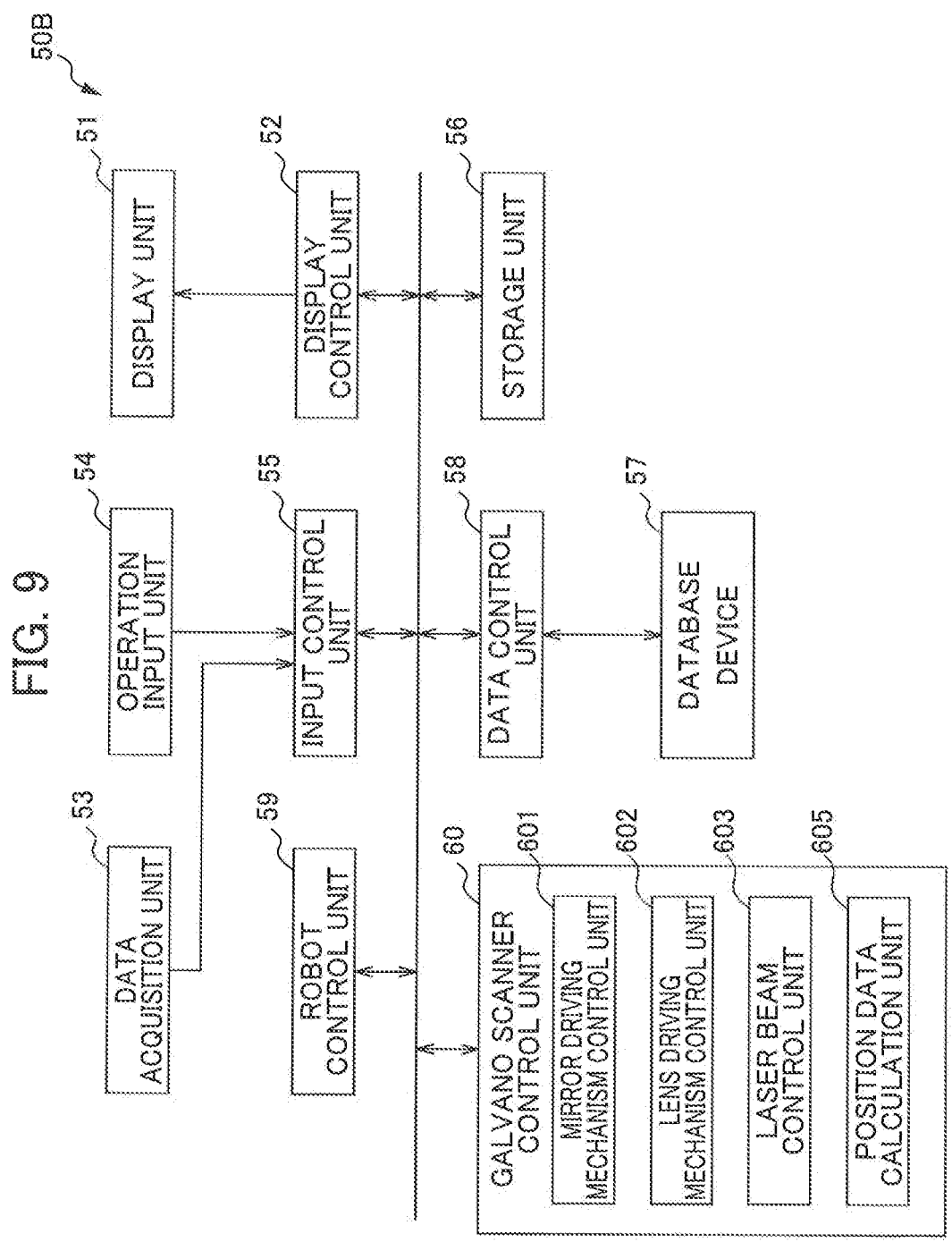
FIG. 9 is a block diagram illustrating the configuration of a control unit 50B in a third embodiment.

The next description is about the third embodiment of the laser machining apparatus 1 according to the present invention. FIG. 9 is a block diagram illustrating the configuration of a control unit 50B in the third embodiment. The control unit 50B of the third embodiment differs from that of the first embodiment in that the database device 57 does not have any data management unit, such as the machining correlation data management unit 571, and that the galvano scanner control unit 60 includes a position data calculation unit 605. In the control unit 50B of the third embodiment, other configurations are the same as those of the control unit 50 of the first embodiment. Therefore, in the third embodiment, only the control unit 50B is illustrated, and the illustration of the entire laser machining apparatus 1 will be omitted. In the explanation and the diagrams of the third embodiment, the same reference numerals as those in the first embodiment are assigned to the members and the like equivalent to those in the first embodiment, whereby redundant explanation will be omitted.

In the third embodiment, in the case where the first mode is set, the position data calculation unit 605 (the galvano scanner control unit 60) calculates a lens position z1 of the lens 45 in the optical axis direction in the first mode, based on a first conversion formula (1) indicated below.

$$z1 = f(Z, g1) \quad (1)$$

Herein, "Z" is a targeted value of the focus position at the time when the machining light is condensed by the lens 45 (hereinafter, also referred to as "a targeted value of the focus position of the machining light"). The value of "g1" is a first coefficient which depends on the wavelength of the machining light.

In the case where the second mode is set, the position data calculation unit 605 calculates a lens position z2 of the lens 45 in the optical axis direction in the second mode, based on a second conversion formula (2) indicated below.

$$z2 = f(Z, g2) \quad (2)$$

Herein, "Z" is a targeted value of the focus position of the machining light. "g2" is a second coefficient which depends on the wavelength of the guide light.

The above-described data on the first conversion formula (1), the second conversion formula (2), the targeted value Z of the focus position of the machining light, the first coefficient g1 and the second coefficient g2 are stored on the database device 57, for example. The data on the lens positions (z1, z2) calculated by the position data calculation unit 605 are stored on the storage unit 56, for example.

As indicated 1n the second conversion formula (2), the position data calculation unit 605 calculates the lens position z2 of the lens 45 in the optical axis direction in the second mode, based on the second conversion formula (2) in which the targeted value Z of the focus position of the machining light and the second coefficient g2 are used as parameters. It is noted that, in the position data calculation unit 605, the conversion formulas may be switched therebetween according to the radiation mode as described above, or the first coefficient g1 may be replaced with the second coefficient g2 in the first conversion formula (1) to calculate the lens position z2 in the optical axis direction of the lens 45 in the second mode.

Figure 10:
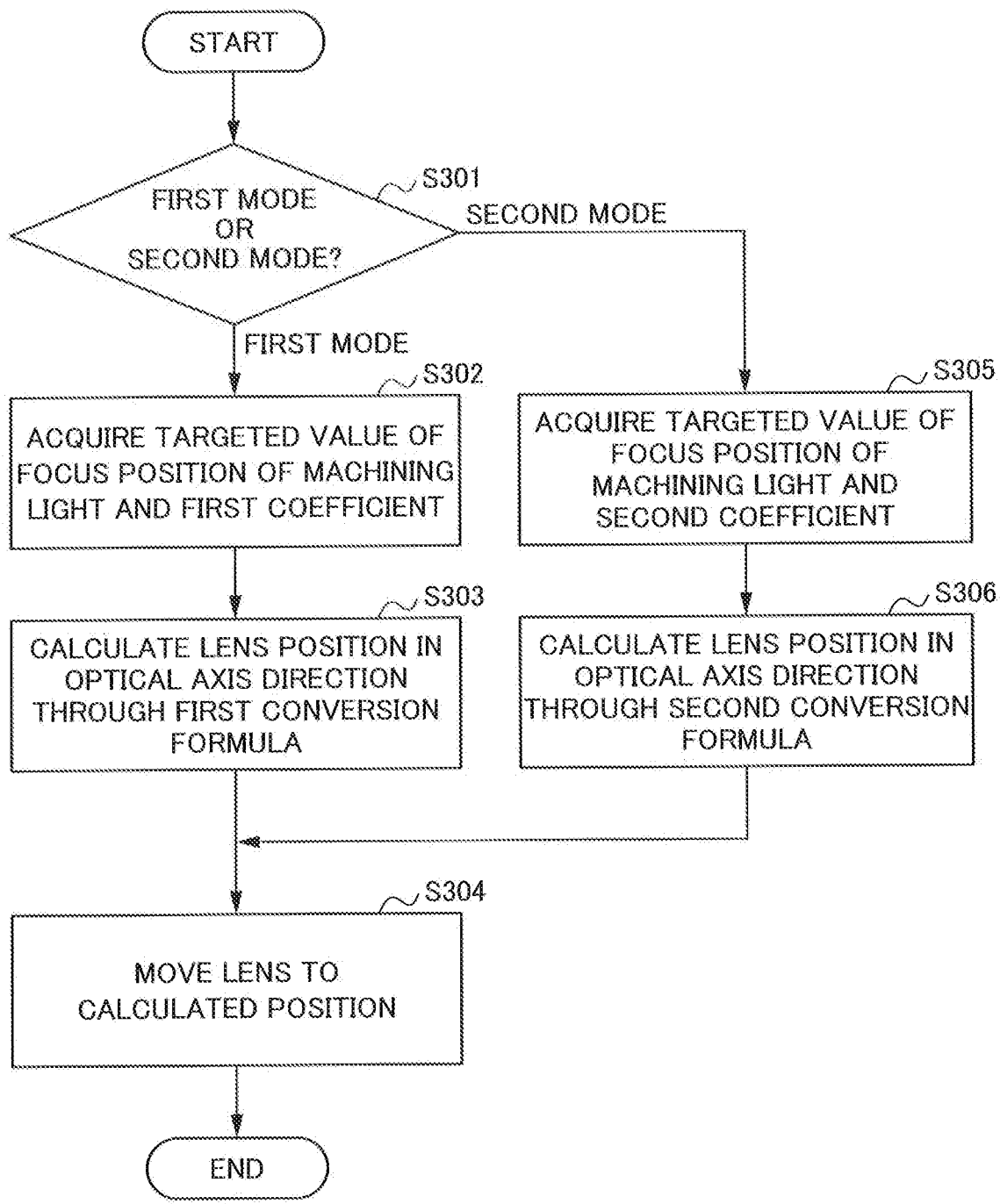
FIG. 10 is a flowchart indicating the procedure in the lens position driving program to be executed by the laser machining apparatus 1 of the third embodiment.

Next, based on the flowchart shown in FIG. 10, the processing contents of the lens position driving program to be executed by the laser machining apparatus 1 (the control unit 503) of the third embodiment will be described. FIG. 10 is the flowchart indicating the procedure in the lens position driving program to be executed by the laser machining apparatus 1 of the third embodiment.

In step S301 shown in FIG. 10, the position data calculation unit 605 determines whether the radiation mode set by an operator is the first mode or the second mode. In the case where, in step S301, the position data calculation unit 605 determines that the set radiation mode is the first mode, that is, in a case where the operator selects to irradiate the machining light, the processing moves to step S302. On the other hand, in the case where the position data calculation unit 605 determines that the set radiation mode is the second mode, that is, in a case where the operator selects to irradiate the guide light, the processing moves to step S305.

In step S302 (the first mode in step S301), the position data calculation unit 605 acquires the targeted value Z of the focus position of the machining light and the first coefficient g1. In step S303, the position data calculation unit 605 calculates the position of the lens 45 in the optical axis direction based on the first conversion formula. In step S304, the lens driving mechanism control unit 602 moves the lens 45 to the position in the optical axis direction calculated in step S303. After the lens 45 is moved, the processing in the present flowchart ends.

On the other hand, in step S305 (the second mode in step S301), the position data calculation unit 605 acquires the targeted value Z of the focus position of the machining light and the second coefficient g2. In step S306, the position data calculation unit 605 calculates the position of the lens 45 in the optical axis direction based on the second conversion formula. The lens driving mechanism control unit 602 subsequently executes the above-described processing in step S304, thereby ending the processing in the present flowchart.

Also, in the laser machining apparatus 1 of the third embodiment described above, as in the first embodiment, since the focus of the guide light which is the laser beam for focus confirmation is prevented from becoming blurred on the machining surface of the workpiece W, an operator can easily determine that the guide light is focused at the focus position on the machining surface of the workpiece W. In particular, since the laser machining apparatus 1 of the third embodiment calculates the lens position based on the formula in which the targeted value of the focus position of the machining light and a preset coefficient are used as parameters, the storage capacity of the database device 57 can be reduced as compared with the configuration in which the machining correlation data and the focus confirmation correlation data are stored on the database device 57.

Although embodiments of the present invention have been described so far, the present invention is not limited to the above-described embodiments. Various modifications and changes are available as in the modifications to be described below, and such modifications and changes are in the technical scope of the present invention. The effects described in the embodiments are listed merely as the most preferable effects produced by the present invention, and the effects produced by the present invention are not limited to those described in the embodiments. It is noted that the above-described embodiments and the modifications to be described below may be combined appropriately, and the detailed description thereof will be omitted.

(Modifications)

Although, in the first embodiment, an example where the focus confirmation correlation data is stored in the focus confirmation correlation data management unit 572 is described, the present invention is not limited thereto. As the function of the database device 57, the focus confirmation correlation data management unit 572 may create the focus confirmation correlation data. In this case, the focus confirmation correlation data may be created using compensation coefficients as in the second embodiment, or may be created using conversion formulas as in the third embodiment, for example.

Although, in the second embodiment, an example where the machining correlation data is stored in the database device 57 and the focus confirmation correlation data is created based on the machining correlation data and compensation coefficients is described, the present invention is not limited thereto. The focus confirmation correlation data may be stored in the database device 57, and the machining correlation data may be created based on the focus confirmation correlation data and compensation coefficients. Alternatively, common correlation data may be stored in the database device 57, and the machining correlation data and the focus confirmation correlation data may be created respectively based on the correlation data and the compensation coefficients set for each radiation mode.

Although, in the third embodiment, an example where the lens positions in the first mode and the second mode are respectively calculated based on the conversion formulas is described, the present invention is not limited thereto. For example, in the first mode (or in the second mode), the lens position may be identified on the basis of the machining correlation data (or the focus confirmation correlation data) as in the first embodiment, without using the conversion formulas. Alternatively, in the first mode (or in the second mode), the machining correlation data (or the focus confirmation correlation data) may be created using compensation coefficients as in the second embodiment, without using the conversion formulas.

Although, in the embodiments, a configuration where the laser machining apparatus is configured with a galvano scanner including two mirrors is described, the present invention is not limited thereto. The laser machining apparatus may be configured with a galvano scanner including one mirror or three or more mirrors. Although, in the embodiments, an example where two laser oscillators (not shown) are switched therebetween in one laser beam source is described, the present invention is not limited thereto. For example, a laser oscillator for outputting machining light and a laser oscillator for outputting guide light may be disposed separately, whereby the laser beam having been output by each of the laser oscillators in each mode is output coaxially using a half mirror.

EXPLANATION OF REFERENCE NUMERALS

1: LASER MACHINING APPARATUS, 2: MULTI-AXIS ROBOT, 3: LASER BEAM SOURCE, 4: LASER HEAD, 50, 50A, 50B: CONTROL UNIT, 56: STORAGE UNIT, 57: DATABASE DEVICE, 59: ROBOT CONTROL UNIT, 60: GALVANO SCANNER CONTROL UNIT, 571: MACHINING CORRELATION DATA MANAGEMENT UNIT, 572: FOCUS CONFIRMATION CORRELATION

DATA MANAGEMENT UNIT, 601: MIRROR DRIVING MECHANISM CONTROL UNIT, 602: LENS DRIVING MECHANISM CONTROL UNIT, 602: LASER BEAM CONTROL UNIT, 604: FOCUS CONFIRMATION CORRELATION DATA CREATION UNIT, 605: POSITION DATA CALCULATION UNIT

What is claimed is:

1. A laser machining apparatus comprising:
a first light source configured to output a first laser beam for machining;
a second light source configured to output a second laser beam for focus confirmation having a wavelength which is different from a wavelength of the first laser beam for machining;
a focus lens configured to condense the first laser beam output by the first light source or the second laser beam output by the second light source toward an object respectively and coaxially;
a mirror mechanism configured to reflect the first laser beam or the second laser beam passed through the focus lens toward the object; and
a lens driving mechanism configured to move the focus lens in an optical axis direction of the first laser beam or the second laser beam,
so as to irradiate the object with the first laser beam output by the first light source or the second laser beam output by the second light source via the focus lens and the mirror mechanism,
the laser machining apparatus further comprising:
a machining correlation data management unit configured to manage machining correlation data which associates a position of the focus lens in the optical axis direction in which the first laser beam for machining is focused on the object with a focus position for machining in the optical axis direction when the first laser beam for machining is condensed by the focus lens so as to be focused on the object;
a focus confirmation correlation data management unit configured to manage or create focus confirmation correlation data which associates the position of the focus lens in the optical axis direction in which the first laser beam for machining is focused on the object with a focus position for focus confirmation in the optical axis direction when the second laser beam for focus confirmation is condensed by the focus lens so as to be focused on the object; and
a lens driving mechanism control unit configured to move, in a first mode, the focus lens in the optical axis direction based on the position of the focus lens in the optical axis direction corresponding to the targeted focus position for machining in the machining correlation data, and to move, in a second mode, the focus lens in the optical axis direction based on the position of the focus lens in the optical axis direction corresponding to the targeted focus position for focus confirmation in the focus confirmation correlation data.

2. A laser machining apparatus comprising:
a first light source configured to output a first laser beam for machining;
a second light source configured to output a second laser beam for focus confirmation having a wavelength which is different from a wavelength of the first laser beam for machining;
a focus lens configured to condense the first laser beam output by the first light source or the second laser beam output by the second light source toward an object respectively and coaxially;
a mirror mechanism configured to reflect the first laser beam or the second laser beam passed through the focus lens toward the object; and
a lens driving mechanism configured to move the focus lens in an optical axis direction of the first laser beam or the second laser beam,
so as to irradiate the object with the first laser beam output by the first light source or the second laser beam output by the second light source via the focus lens and the mirror mechanism,
the laser machining apparatus further comprising:
a machining correlation data management unit configured to manage machining correlation data which associates a position of the focus lens in the optical axis direction in which the first laser beam for machining is focused on the object with a focus position for machining in the optical axis direction when the first laser beam for machining is condensed by the focus lens so as to be focused on the object;
a focus confirmation correlation data management unit configured to calculate a focus position for focus confirmation in the optical axis direction when the second laser beam for focus confirmation is condensed by the focus lens so as to be focused on the object, based on the focus position for machining in the machining correlation data a preset compensation coefficient, and to create focus confirmation correlation data which associates the position of the focus lens in the optical axis direction with the focus position for focus confirmation; and
a lens driving mechanism control unit configured to move, in a first mode, the focus lens in the optical axis direction based on the position in the optical axis direction of the focus lens corresponding to the targeted focus position for machining in the machining correlation data, and to move, in a second mode, the focus lens in the optical axis direction on a basis of the position in the optical axis direction of the focus lens corresponding to the targeted focus position for focus confirmation in the focus confirmation correlation data created by the focus confirmation correlation data management unit.

3. A laser machining apparatus comprising:
a first light source configured to output a first laser beam for machining;
a second light source configured to output a second laser beam for focus confirmation having a wavelength which is different from a wavelength of the first laser beam for machining;
a focus lens configured to condense the first laser beam output by the first light source or the second laser beam output by the second light source toward an object respectively and coaxially;
a mirror mechanism configured to reflect the first laser beam or the second laser beam passed through the focus lens toward the object; and
a lens driving mechanism configured to move the focus lens in an optical axis direction of the first laser beam or the second laser beam,
so as to irradiate the object with the first laser beam output by the first light source or the second laser beam output by the second light source via the focus lens and the mirror mechanism,
the laser machining apparatus further comprising:
a position data calculation unit configured to calculate, in a first mode, a position of the focus lens in the optical axis direction in which the first laser beam for machining is focused on the object through a first conversion formula using, as parameters, a targeted value of a focus position in the optical axis direction when the first laser beam for machining is condensed by the focus lens so as to be focused on the object and a first coefficient set with respect to the first laser beam for machining, and to calculate, in a second mode, the position of the focus lens in the optical axis direction through a second conversion formula using, as parameters, the targeted value of the focus position in the optical axis direction when the first laser beam for machining is condensed by the focus lens so as to be focused on the object and a second coefficient set with respect to the second laser beam for focus confirmation; and a lens driving mechanism control unit configured to move, in the first mode, the focus lens in the optical axis direction based on the position in the optical axis direction of the focus lens calculated with the first conversion formula by the position data calculation unit, and to move, in the second mode, the focus lens in the optical axis direction based on the position in the optical axis direction of the focus lens calculated through the second conversion formula by the position data calculation unit.

* * * * *